United States Patent [19]

Rawstron

[11] Patent Number: 4,817,916

[45] Date of Patent: Apr. 4, 1989

[54] BUTTERFLY VALVE

[75] Inventor: William W. Rawstron, Northboro, Mass.

[73] Assignee: Jamesbury Corporation, Worcester, Mass.

[21] Appl. No.: 123,417

[22] Filed: Nov. 20, 1987

Related U.S. Application Data

[63] Continuation-in-part of Ser. No. 23,430, Mar. 9, 1987, abandoned.

[51] Int. Cl.$^4$ ............................................. F16K 1/22
[52] U.S. Cl. .................................... 251/163; 251/162
[58] Field of Search ............... 251/56, 162, 163, 158, 251/192, 305

[56] References Cited

U.S. PATENT DOCUMENTS

| | | | |
|---|---|---|---|
| 2,892,609 | 6/1959 | Bibbo | 251/103 |
| 2,934,310 | 4/1960 | Kinney et al. | 251/163 |
| 3,780,983 | 12/1973 | Topham et al. | 251/163 X |

FOREIGN PATENT DOCUMENTS 1184986  7/1959  France .................................. 251/163

Primary Examiner—A. Michael Chambers
Assistant Examiner—John C. Fox
Attorney, Agent, or Firm—Oblon, Fisher, Spivak, McClelland & Maier

[57] ABSTRACT

A butterfly valve wherein at least one cam is mounted on the valve shaft and located in a cam chamber associated with the valve disc. The cam cooperates with the cam chamber to rotate the valve disc between an open position and a closed position in alignment with and spaced from the valve seat at which point further rotation of the disc is prevented by stop means. The cam then further cooperates with the cam chamber to force the valve disc linearly into a seated position in engagement with the valve seat. Belleville springs engage the cam and force the valve disc away from engagement with the valve seat. A normal 90° valve actuator may be used.

13 Claims, 4 Drawing Sheets

BUTTERFLY VALVE

This application is a continuation-in-part of applicant's co-pending application, Ser. No. 023,430, filed Mar. 9, 1987 now abandoned.

BACKGROUND OF THE INVENTION

Butterfly valves are extensively used in industry because of their simplicity, dependability and economy. They are often used for control purposes at least in the range from fully closed to 60 or 70 percent open. The normal type of butterfly valve is sealed by rotating the valve disc directly into an engagement with the valve seat. This normally requires that the valve seat be somewhat flexible and/or that it be formed to very close tolerances. If the fit of the disc against the seat is too tight, excessive forces are required to open and close the valve and rotation of the disc into the seat can cause uneven wear and eventual leakage. Therefore, butterfly valves have traditionally been used primarily for lower relative pressures.

One of the techniques used to overcome some of the problems with conventional butterfly valves where the disc is rotated directly into the seat is to have the disc rotate into position to be seated and then be translated linearly or axially into the seat. This therefore avoids the problems of having the disc be rotated directly into the seat. However, the prior art mechanisms for accomplishing this linear or axial translation have been complicated, costly and/or excessively restrictive of fluid flow. Some do not provide for a positive mechanical closing but rather rely on fluid pressure for the linear translation. Others require a large angle of rotation of the valve shaft.

SUMMARY OF THE INVENTION

An object of the present invention is to avoid the problems associated with having the disc of a butterfly valve rotate directly into the valve seat by providing means for rotating the valve disc into position for closing and then linearly translating the disc axially into positive sealing engagement with the valve seat. More specifically, the shaft for rotating the valve disc is provided with at least one cam means which cooperates with the valve disc and associated spring means to force the disc linearly into and out of engagement with the valve seat. The arrangement of the cam with respect to the valve disc and the surfaces on which the cam operates are such that the valve is operated between its fully seated position and a position where it is substantially fully open by means of a conventional valve actuation with a stroke of 90° of rotation.

DESCRIPTION OF THE PREFERRED EMBODIMENT

Figure 1:
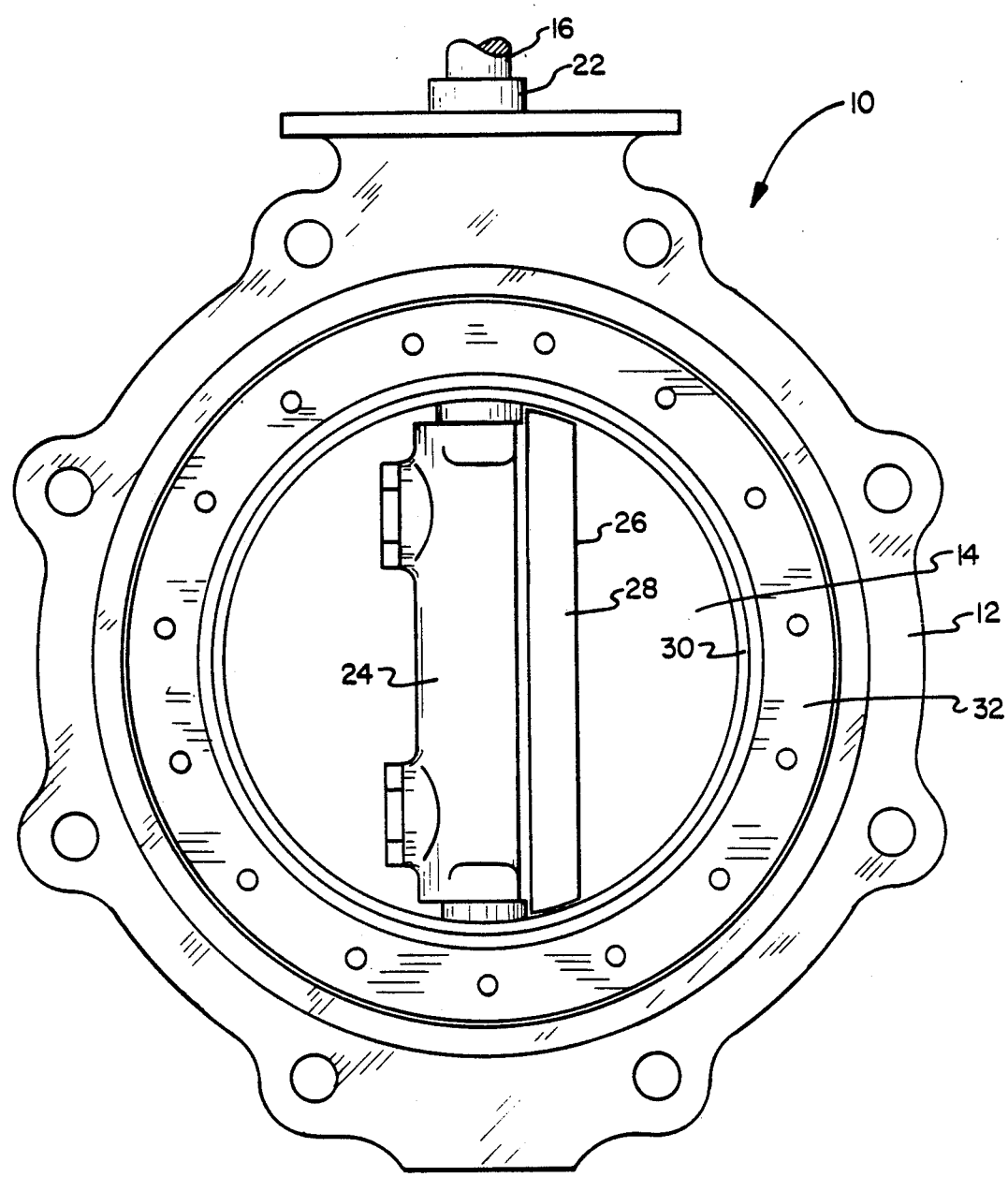
FIG. 1 is an external end view of a butterfly valve embodying the present invention and showing the valve in the open position.
Figure 2:
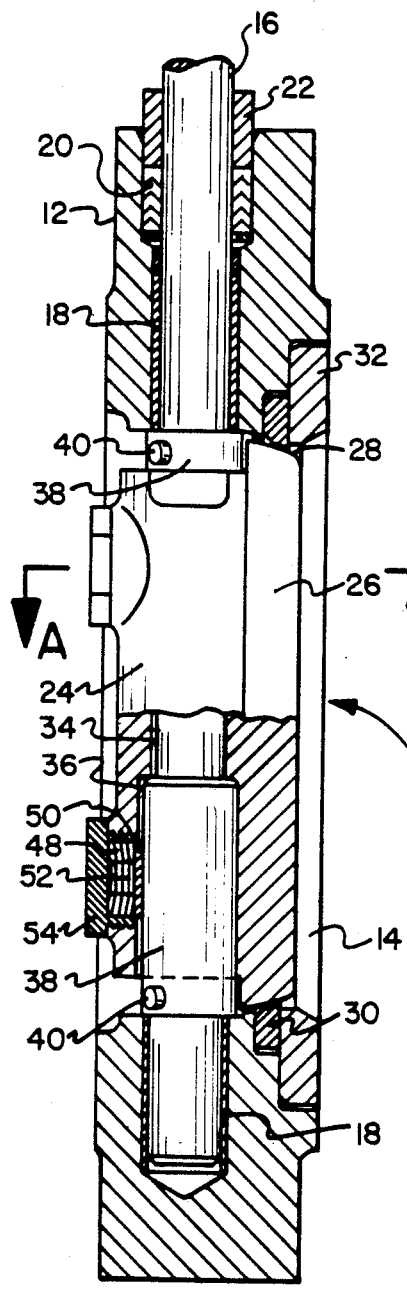
FIG. 2 is a side view of the butterfly valve of the present invention partially in cross-section.

Referring first to FIGS. 1 and 2, there is illustrated a butterfly valve 10 comprising a valve body 12 which defines a flow channel 14 of circular cross-section extending through the valve body 12. A valve shaft 16 is mounted in the valve body 12 and extends across a diameter of the flow channel 14. The valve shaft 16 is mounted in the valve body 12 by means of the bearings 18 and the shaft seals 20 and compression ring 22. Affixed to the valve shaft 16 by an attachment or mounting means generally indicated by reference numeral 24 is the valve disc 26. The peripheral surface 28 of the valve disc 26 is adapted to seal against the valve seat 30 which extends around the periphery of the flow channel 14. The valve seat 30 is maintained in position by the retaining ring 32.

Figure 3:
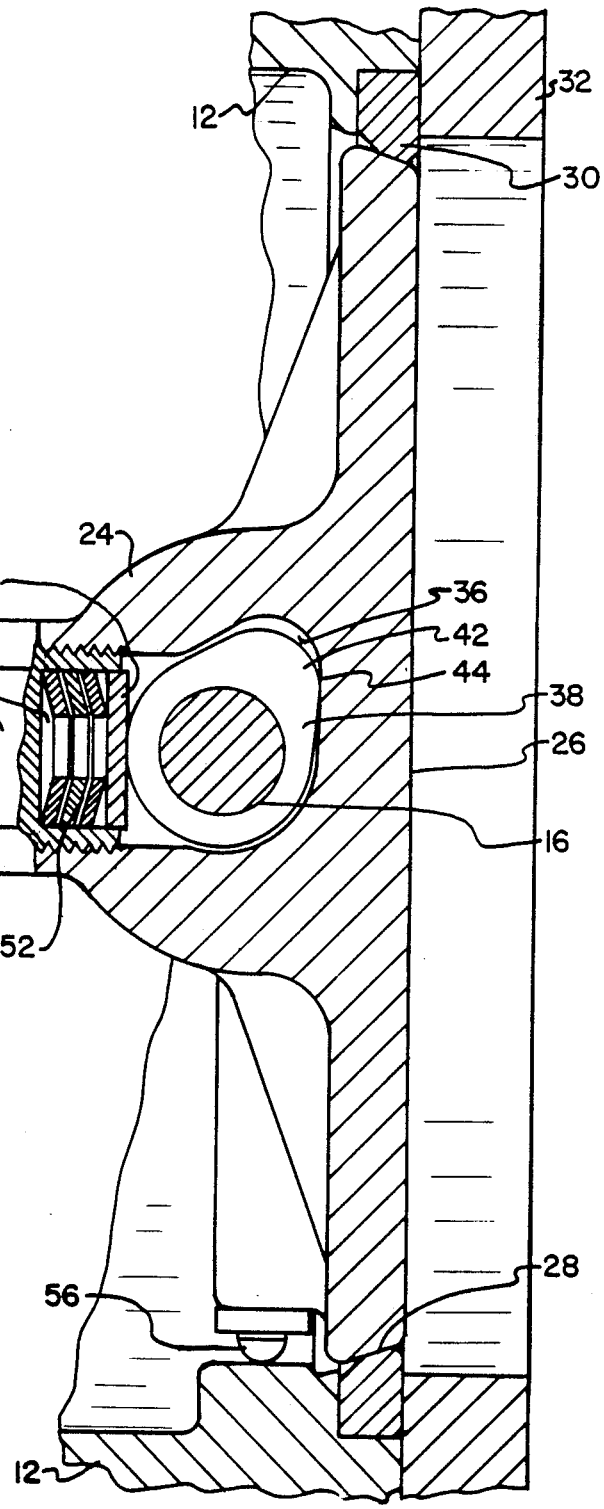
FIG. 3 is a simplified view taken along line 3—3 of FIG. 2 illustrating the valve in the fully seated position.
Figure 4:
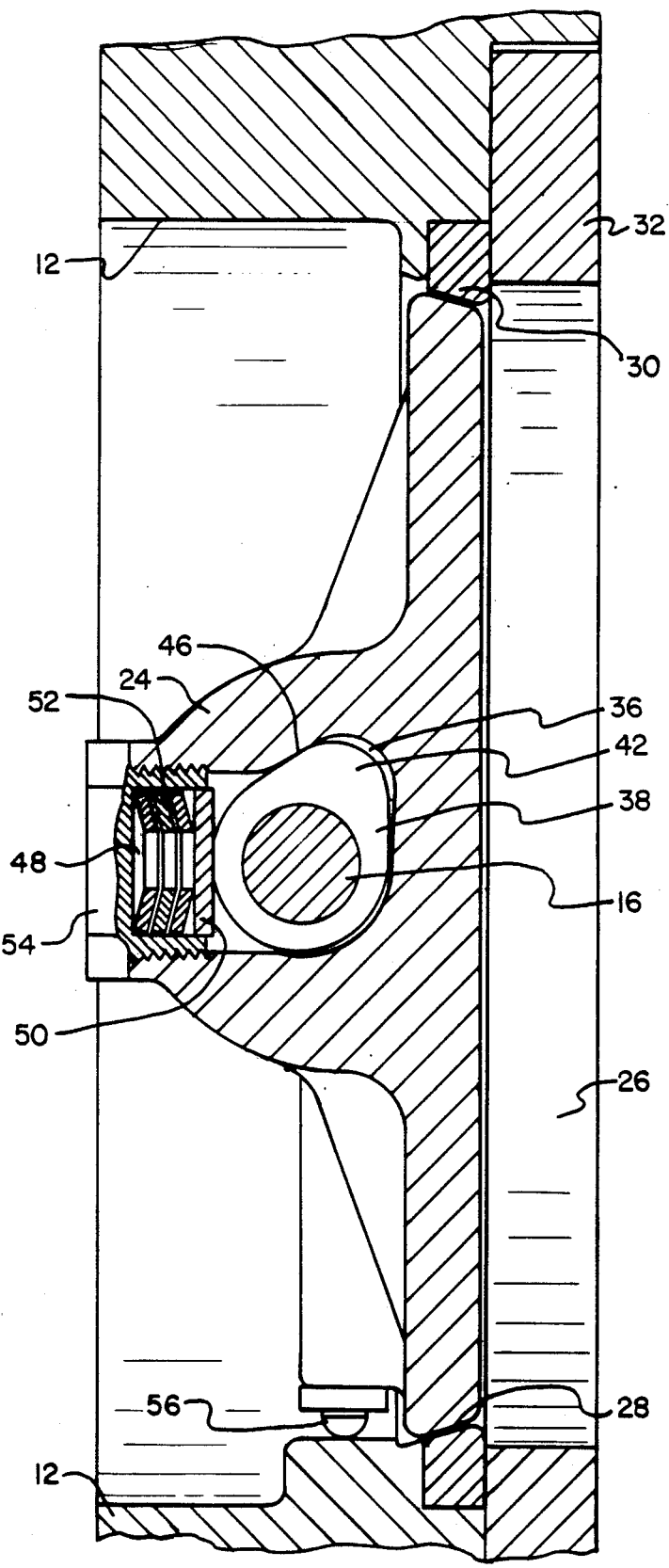
FIG. 4 illustrates the valve disc of FIG. 3 linearly retracted and un-seated from the valve seat but still in the closed position.

Referring now to FIGS. 2, 3 and 4, the disc mounting means 24 contains a valve shaft passageway 34 through which the valve shaft 16 extends. This passageway 34 contains two cam chambers 36 in which the cams 38 are located. These cams 38 are pinned to the valve shaft 16 by means of the pins 40. Therefore, rotation of the shaft 16 will cause rotation of the cams 38 within the cam chambers 36. It is to be understood that, although the preferred embodiment illustrates two cams, there may only be one cam or any desired number of cams depending particularly on the size and pressure class of the valve.

Extending into each cam chamber 36 is an opening 48 extending through the attachment means 24. Located in this opening is a spacer 50 and a stack of belleville springs 52. The spacer 50 and the stack of belleville springs are retained in the opening 48 by the hex-headed plug or cap 54 which is screwed into the opening 48. The belleville spring stack 52 is compressed during assembly by tightening the hex-headed plug. The springs thus force the attachment means 24 and the valve disc 26 to the left (as the valve is oriented in FIGS. 2, 3, 4 and 5) into an unseated but still closed position. Since the spring acts directly on the diameter and through the axis of the valve shaft 16, the spring will not tend to cant or cock the valve disc.

Figure 5:
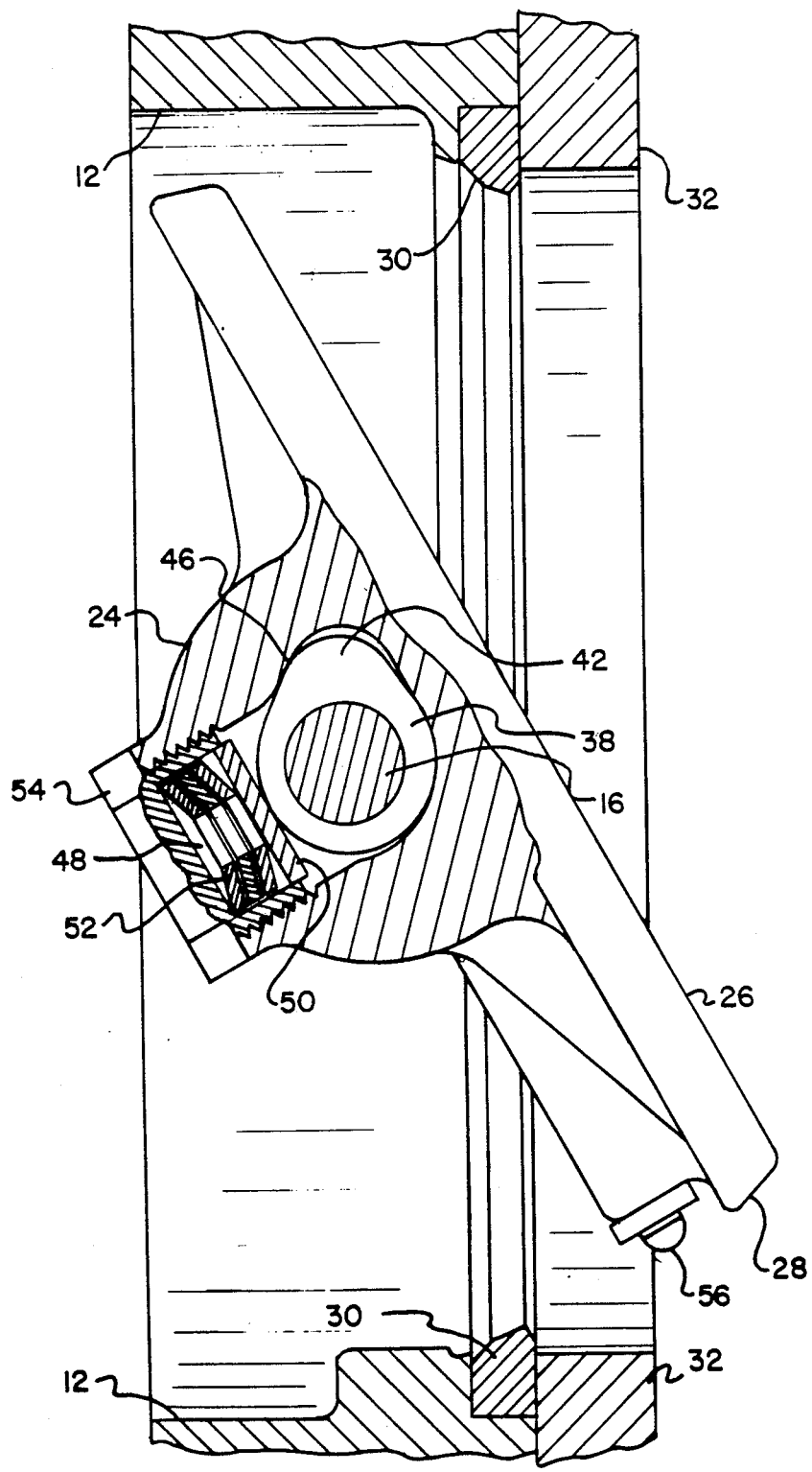
FIG. 5 illustrates the valve in the partially open position.

FIG. 3 shows the valve in the fully seated position in which the lobe 42 of the cam 38 is forced against the surface 44 of the cam chamber by the clockwise rotation of the shaft 16 thereby forcing the valve disc 26 to the right and into the valve seat 30. The valve seat, which is normally metal, deflects very slightly to form a tight seal. When the shaft 16 is then rotated counterclockwise, the cam 38 is also rotated counterclockwise into the position shown in FIG. 4 such that the cam lobe 42 moves away from the surface 44 of the cam chamber 36 thereby relieving the pressure of the cam against the surface 44. The compressed belleville springs are thereby free to force the valve disc 26 to the left and away from the valve seat 30 into the closed but unseated position shown in FIG. 4. The preferred axial movement of the valve disc from the seated to the closed position is on the order of 0.05 inches (0.127 cm). Continued rotation of the valve shaft 16 and the cam 38 will then begin to rotate the valve disc 26 by the action of the cam lobe 42 on the surface 46 of the cam chamber in the counterclockwise direction to an open or partially open position such as shown in FIG. 5. It can readily be seen from the drawings that only a very small degree of rotation of the valve shaft 16 is necessary to move the lobe 42 of the cam 38 from engagement with surface 44 and into engagement with surface 46 while at the same time translating the valve disc axially away from the valve seat. This degree of rotation of the arrangement shown in the drawings is on the order of 8° and in any case it should be less than 15°. With a 15° shaft rotation for translating the valve disc from the seated to the closed position, that leaves 75° of rotation of the disc when using a 90° actuator. When butterfly valves are used for control, the control range is normally within the range of fully closed to 60 or 70 percent open so the 75° of disc rotation is more than adequate for a butterfly control valve.

When the valve is rotated from the position shown in FIG. 5 to the closed position in which it is ready to be seated shown in FIG. 4, the rotation of the valve disc is stopped by means of the rotational stop 56 when it engages the valve body 12. This rotational stop 56 is adjustable so that the rotation will be stopped in the correct position for the valve disc to then be seated. After the rotational stop 56 has engaged the valve body 12 to stop the rotation of the valve disc, further rotation of the cam 38 will then cause the cam lobe 42 to engage the surface 44 and linearly move the valve disc into engagement with the seat 30. The rotational stop can be mounted on the valve disc as shown or could be mounted on the valve body.

The butterfly valve of the present invention exhibits the usual attributes of a butterfly valve including a high flow capacity for a particular size valve, good control characteristics and ease and simplicity of actuation. The fact that the butterfly valve of the present invention seats by axial-movement of the butterfly disc provides the additional attribute that the valve will form a tight seal with a hard, usually metallic, seating material without scuffing the disc against the seat. The seat can be massive and relatively rigid and thus rugged and durable. In the absence of the axial movement, the seat must be relatively flexible to provide a tight seal and there is rubbing or scuffing between the disc and the seal. The mechanism of the present invention for providing the rotational and axial movement of the disc is mechanically simple, requires only a conventional 90° actuator, and does not complicate the normal ease of actuation of butterfly valves. Actuators with a 90° stroke are widely available in commerce. Acutators stroking greater than 90° are unusual and generally quite uneconomical as compared to 90° actuators.

I claim:

1. A valve comprising, a valve body, a passageway through said valve body, an annular valve seat position in and surrounding said passageway, a valve shaft rotatably mounted within said passageway on an axis located at right angles to the axis of said passageway, a valve closure member, and mounting means for mounting said valve closure member on said valve shaft adapted to move said valve closure member upon 90° of rotation of said valve shaft between an open position, a closed position in alignment with and spaced from said annular valve seat, and a seated position in which an annular surface of said valve seat, and a seated position in which an annular surface of said valve closure member engages said annular valve seat, said mounting means comprising a valve shaft passageway therein through which said valve shaft passes, and at least one cam chamber therein surrounding said valve shaft, and wherein said valve further comprises (a) a cam mounted on said valve shaft and rotatable therewith, said cam located in said cam chamber and said cam and said cam chamber being sized such that said cam engages said cam chamber upon rotation of said cam of 15° or less to move said mounting means and said valve closure member linearly along the axis of said passageway between said closed and said seated positions, (b) spring biasing means mounted on said mounting means and engaging said cam adapted to bias said mounting means and valve closure member from said seated position away from said annular valve seat linearly along said axis of said passageway to said closed position and (c) rotational stop means adapted to provide engagement between said valve body and said valve closure member to prevent further rotation of said valve closure member when said valve closure member has been rotated to said closed position in alignment with said annular valve seat.

2. A valve as recited in claim 1 wherein said spring biasing means comprises a stack of belleville springs.

3. A valve as recited in claim 1 wherein said valve closure member is a butterfly valve disc.

4. A valve as recited in claim 3 wherein said mounting means is attached to the face of said butterfly valve disc away from said annular valve seat.

5. A valve as recited in claim 3 wherein said spring biasing means comprises a stack of belleville springs.

6. A valve as recited in claim 3 wherein said rotational stop means is mounted on said butterfly valve disc.

7. A valve as recited in claim 6 wherein said rotational stop means is adjustable whereby the rotation of said butterfly valve disc may be adjusted.

8. A valve as recited in claim 1 wherein said rotational stop means is mounted on said valve closure member.

9. A valve as recited in claim 8 wherein said rotational stop means is adjustable whereby the rotation of said valve closure member may be adjusted.

10. A valve as recited in claim 1 wherein said mounting means comprises two cam chambers, a cam mounted on said valve shaft in each of said cam chambers and spring biasing means mounted on said mounting means and engaging each of said cams.

11. A valve as recited in claim 10 wherein said cams are pinned to said valve shaft.

12. A valve as recited in claim 1 wherein the linear movement of said valve closure member is about 0.05 inches (0.127 cm).

13. A valve as recited in claim 1 wherein said rotational stop means is adjustable whereby the rotation of said valve closure member may be adjusted.

* * * * *